United States Patent
Cannata et al.

(10) Patent No.: US 7,213,691 B2
(45) Date of Patent: May 8, 2007

(54) ANTILOCK BRAKE SYSTEM

(76) Inventors: Antonio Cannata, 14 Patience Crescent, London, Ontario (CA) N6E 2K9; Andrew M. Spriet, 1196 St. Anthony Road, London, Ontario (CA) N6H 2RI ( * ) Notice: Subject to any disclaimer, the term of this patent is extended or adjusted under 35 U.S.C. 154(b) by 151 days.

(21) Appl. No.: 11/118,407

(22) Filed: May 2, 2005

(65) Prior Publication Data

US 2005/0252733 A1  Nov. 17, 2005

Related U.S. Application Data

(63) Continuation-in-part of application No. 10/842,721, filed on May 11, 2004, now Pat. No. 6,942,071.

(51) Int. Cl.
*F16D 57/06* (2006.01)

(52) U.S. Cl. ........................ 188/295; 303/152

(58) Field of Classification Search .................. 303/10, 303/116.4, 13, 15, 152; 188/72.1, 72.4, 156, 188/162, 295

See application file for complete search history.

(56) References Cited

U.S. PATENT DOCUMENTS

| | | | |
|---|---|---|---|
| 1,580,322 A | 4/1926 | Martin | |
| 1,741,875 A | 12/1929 | Paul | |
| 2,880,825 A | 4/1959 | Porter | 188/91 |
| 3,638,768 A | 2/1972 | Ostwald | 188/294 |
| 3,983,966 A | 10/1976 | Bryant | 188/2 R |
| 4,451,094 A | 5/1984 | Martin | 303/10 |
| 4,530,416 A | 7/1985 | Kassai | 180/307 |
| 5,178,238 A | 1/1993 | Schaeff | 188/295 |
| 5,325,944 A | 7/1994 | Livingston, Sr. | 188/294 |
| 5,465,817 A * | 11/1995 | Muscatell | 188/295 |
| 6,068,351 A | 5/2000 | Martin-Gerez | 303/10 |
| 6,328,388 B1 | 12/2001 | Mohr et al. | 303/10 |
| 6,360,854 B1 | 3/2002 | Hwang | 188/151 R |
| 6,634,723 B1 * | 10/2003 | Ganzel et al. | 303/119.3 |
| 6,929,103 B2 * | 8/2005 | Cannata | 188/295 |

FOREIGN PATENT DOCUMENTS

CA  2068144  11/1992
WO  02/00482  1/2002

* cited by examiner

*Primary Examiner*—Melanie Torres
(74) *Attorney, Agent, or Firm*—Vincent Patent Agency; Robert A. Vincent (57) ABSTRACT

An antilock brake system for use with a self-energizing brake system having hydraulic interconnected actuators that act on an eccentric rotor and a brake exciter that provides for disengagement of the actuators from the rotor. The antilock brake system has wheel speed sensors that provide for a control module to determine when a wheel is in a state of immanent brake lock-up and to generate a control signal. Responsive to the control signal a brake disengagement module provides for regulation of the brake force generated by the brake system by alternately causing the exciter to operate the actuators to disengage and to re-engage the rotor.

3 Claims, 6 Drawing Sheets

ANTILOCK BRAKE SYSTEM

CROSS REFERENCE TO RELATED APPLICATIONS

This application is a continuation-in-part of U.S. patent application Ser. No. 10/842,721, entitled "Self-Energizing Brake System", filed May 11, 2004 now U.S. Pat. No. 6,942,071, the entirety of which is incorporated herein by reference.

FIELD OF INVENTION

The present invention relates to the field of brake systems. In particular, to an antilock brake system.

BACKGROUND

An antilock braking system (commonly known as ABS) is a system used on a wheeled vehicle which prevents the wheels from locking when brakes acting on each of the wheels are applied. A typical ABS comprises a control module, wheel speed sensors and one or more brake hydraulic modulators. A wheel speed sensor is typically associated with each wheel (alternatively, a pair of wheels on a common axle can share a wheel speed sensor). The wheel speed sensor provides a speed signal to the control module from which the control module can derive the speed of the wheel as well as acceleration and deceleration of the wheel. Based on the speed signals received from the wheel speed sensors and the application of one or more control algorithms, the control module can determine when one of the wheels is approaching lock-up. When a wheel is approaching lock-up the control module sends a control signal to the hydraulic modulator to modulate the brake acting on the wheel. The hydraulic modulator modulates the brake by alternately relieving and reapplying the brake pressure applied by a brake master cylinder to the brake at the wheel.

The hydraulic modulator typically comprises solenoid operated valves connected to a brake circuit associated with each wheel. The valves permit hydraulic pressure applied to the brake by the master cylinder to be interrupted and the pressure relieved and reapplied. In some implementations the hydraulic modulator can also comprise a high-pressure hydraulic pump and a pressure accumulator. The pump and accumulator can be used to reapply pressure to the brake as the hydraulic modulator cycles between relieving and reapplying pressure to the brake. The hydraulic modulator is typically a complex and expensive-to-manufacture component that increases the cost of producing and operating a vehicle equipped with a conventional antilock brake system.

SUMMARY OF INVENTION

The present invention is directed to an antilock brake system for use with a self-energizing brake system in a wheeled vehicle. The self-energizing brake system can have hydraulic actuators that act on a rotor and a brake exciter that provides for disengagement of the actuators from the rotor. The antilock brake system has wheel speed sensors, each associated with one the vehicle wheels, that provide a speed signal to a control module. The control modules determines when a wheel is in a state of immanent brake lock-up and generates a control signal. Responsive to the control signal a brake disengagement module provides for regulation of the brake force generated by the brake system connected to the wheel by alternately causing the exciter to operate the actuators to disengage and to re-engage the rotor.

In accordance with one aspect of the present invention, an antilock brake system for use in a wheeled vehicle having associated with each of a plurality of wheels a self-energizing brake system having hydraulically interconnected actuators that act on an eccentric rotor to generate a brake force and a brake exciter that provides for operating the actuators between a first position not in engagement with the eccentric rotor and a second position in engagement with the eccentric rotor, the antilock brake system comprising: a plurality of wheel speed sensors, each one connected to one of the plurality of wheels such that it can sense rotation of the wheel and generate a speed signal representative of the speed of rotation of the wheel; a control module that can receive said speed signal from each of said plurality of wheel speed sensors, can apply pre-determined algorithms to said speed signals to determine when any of the wheels is in a state of immanent brake lock-up and can generate a control signal for a wheel that is in a state of immanent brake lock-up; and a plurality of brake disengagement modules, each one associated with a self-energizing brake system, that can, responsive to said control signal received from said control module, cause the exciter to operate the actuators into the first position not in engagement with the eccentric rotor; wherein cyclic generation of said control signal by said control module provides for regulation of braking forces generated by the self-energizing brake system.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which:

FIGS. 1 A and B are a front and side view, respectively, of a schematic representation of a brake system with which the present invention can be used.

FIGS. 3 A and B are a front and side partial cross-sectional views, respectively, of a brake effecter module which the present invention can be used.

FIGS. 3 C–F are front partial cross-sectional views of a brake effecter module with which the present invention can be used showing the brake controller valve and the brake exciter in a variety of operating positions.

DETAILED DESCRIPTION

Figure 4:
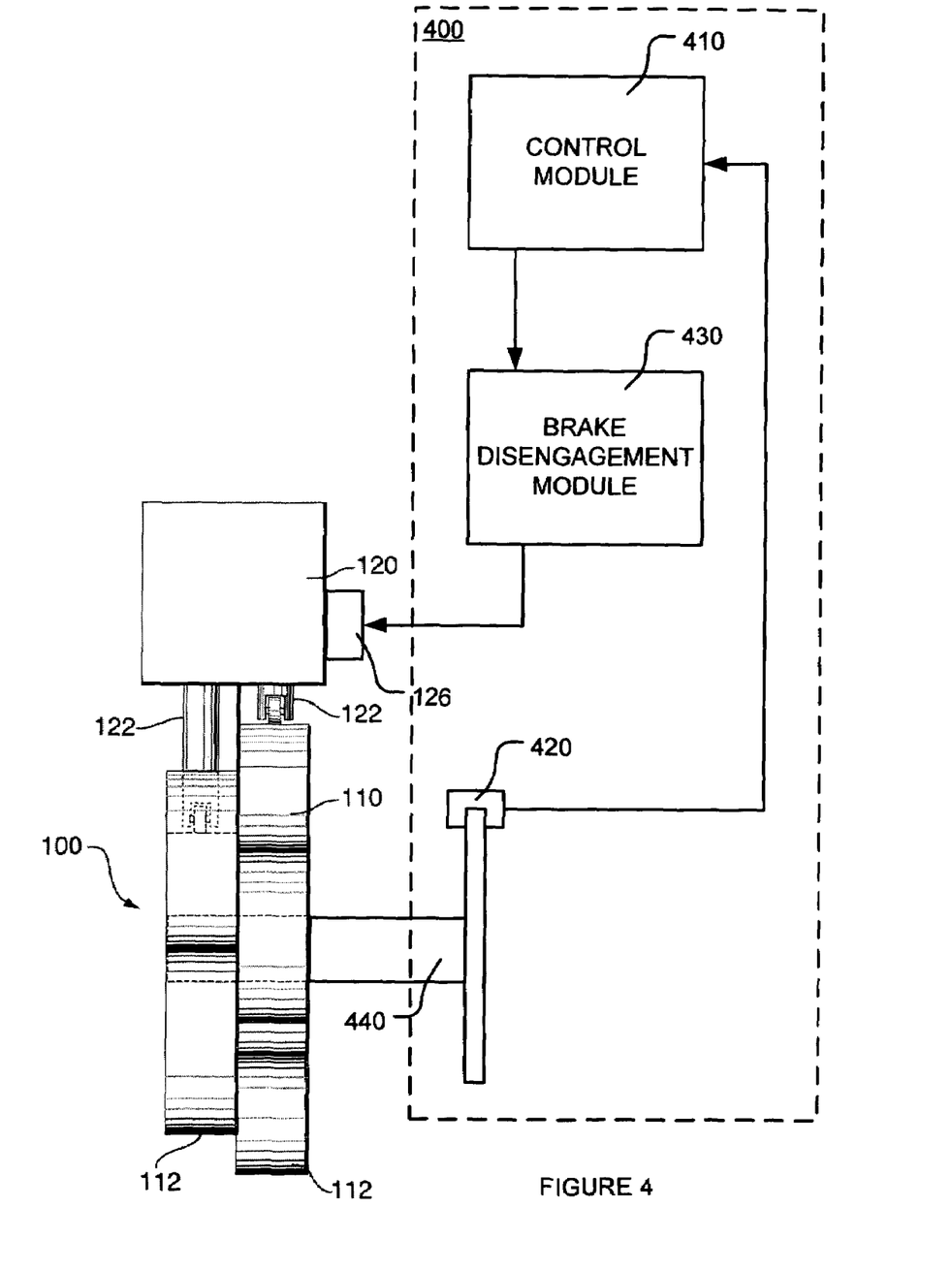
FIG. 4 is a schematic representation of an exemplary embodiment of the antilock brake system according to the present invention together with an example environment in which the antilock brake system can be used.

FIG. 4 is a schematic representation of an exemplary embodiment of an antilock brake system 400 according to the present invention together with an example brake system 100 with which the antilock brake system 400 can be used. The antilock brake system 400 comprises a control module 410, a plurality of wheel speed sensors 420 and a plurality of brake disengagement modules 430. Note that for illustrative purposes only one wheel speed sensor 420 and one braking disengagement module 430 is represented in FIG. 4.

Each of the plurality of wheel speed sensors 420 is a sensor that is connected to the wheel (not illustrated) so that it can sense rotation of the wheel and send a speed signal that represents the rotational speed of the wheel to the control module 410. In the embodiment illustrated in FIG. 4 the wheel speed sensor 420 is connected to the brake system 100 via a shaft 440; the brake system 100 is connected to the wheel (not illustrated). In an alternative embodiment the wheel speed sensor 420 can be connected directly to the wheel so that it can sense rotation of the wheel. From the speed signals received from each of the wheel speed sensors 420, the control module 410 can derive the speed, acceleration and deceleration of each of the wheels. The control module 410 can use one or more control algorithms that take into account the speed of each wheel, the relative speeds of the wheels, the rates of acceleration and deceleration of each wheel, and other similar parameters to determine when each wheel is in a state of immanent brake lock-up. Each of the plurality of brake disengagement modules 430 is operably connected to the control module 410 and to the brake system 100 connected to one of the wheels.

Figure 1A:
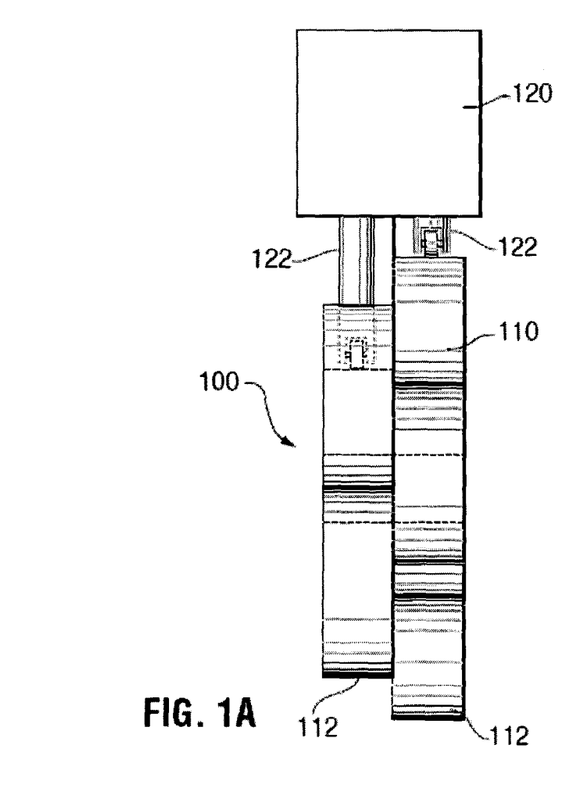
Figure 1B:
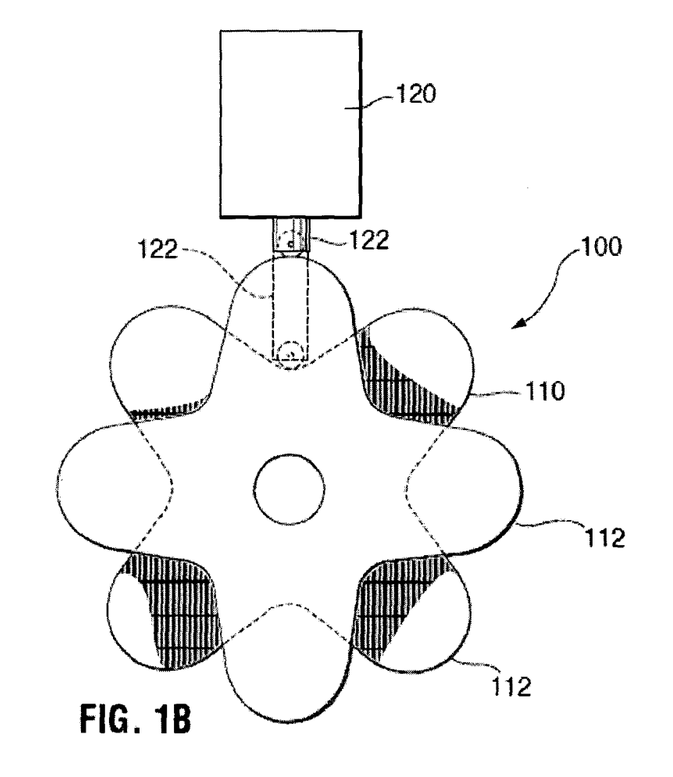

FIGS. 1 A and B are a front and side view, respectively, of schematic representations of a brake system 100 with which the present invention can be used in, for example, a wheeled vehicle. The brake system 100 is comprised of a rotor 110 and a brake effecter module 120. The rotor 110 can be connected to a vehicle wheel (not shown) so as to rotate when the wheel rotates. The rotor has two eccentric (cam) surfaces 112. The brake effecter module 120 has a pair of hydraulically interconnected actuators 122, a brake control valve 124 and a brake exciter 126. Each of the pair of actuators 122 can engage a different one of the two eccentric surfaces 112 of the rotor. The brake control valve 124 effects braking by restricting the flow of a working fluid that is pumped out by each of the actuators 122 as it engages the rotating rotor. The degree of restriction to the flow of the working fluid can be varied to adjust the amount of braking force applied. The working fluid can be, for example, brake fluid, automatic transmission fluid (ATF) or other similar non-compressible fluids. The brake system 100 can be considered self-energizing in that it is not reliant on a substantial external source of energy to effect braking. The energy required to pump the working fluid is derived from the rotation of the rotor 110. The brake exciter 126 provides for disengagement of the actuators 122 from the rotor when braking force is not being applied.

The rotor 110 is substantially disc-shaped with two eccentric surfaces 112 disposed for peripheral engagement by the actuators 122 (see FIG. 1B). The two eccentric surfaces 112 have corresponding cam profiles in terms of a number of undulations on each surface and the amplitude of the undulations. The two eccentric surfaces 112 can be arranged such that there is a radial angle displacement between corresponding points on the eccentric surfaces 112 (i.e. that one eccentric surface 112 is rotated relative to the other). When installed on a vehicle, the rotor 110 is so arranged that it is rotatably connected to a wheel (not illustrated) of the vehicle. Rotation of the wheel causes the rotor 110 to rotate and braking force applied to the rotor 110 causes braking (deceleration) of the wheel. The brake system 100 can also be used to prevent acceleration of the wheel such as, for example, to hold the vehicle stationary.

Figure 2:
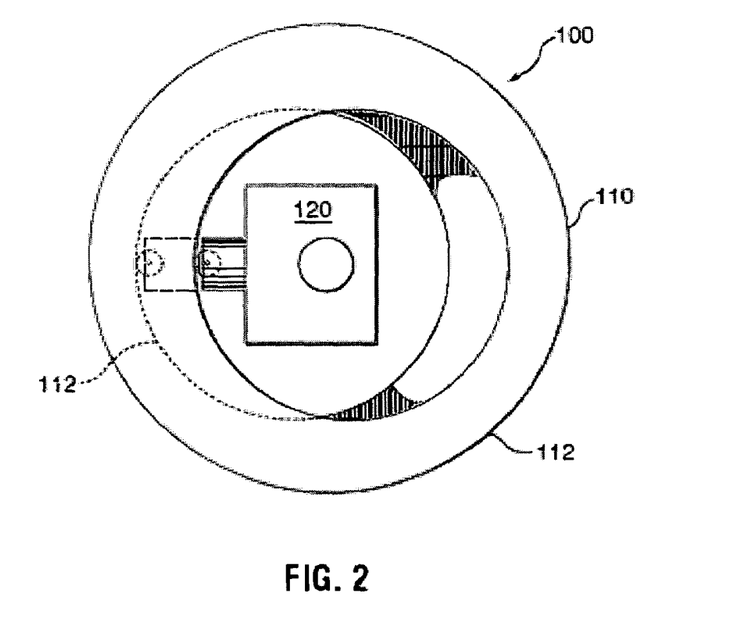
FIG. 2 is a side view of a schematic representation of another exemplary embodiment of a brake system which the present invention can be used.

The rotor 110 of FIGS. 1 A and B has four lobes on each of the two eccentric surfaces 112. In an alternative embodiment of the brake system 100, each eccentric surface 112 can have one, two, three or more lobes while remaining within the scope and spirit of the present invention. In a further alternative embodiment, the rotor 110 can be formed from two disc elements (in immediate contact or spaced apart) each having an eccentric surface 112. FIG. 2 is a side view of a schematic representation of another exemplary embodiment of a brake system 100 in which the two eccentric surfaces 112 can be arranged on the interior periphery of the rotor 110 for engagement by a brake effecter module 120 having actuators 122 extending radially outward relative to the axis of rotation of the rotor 110. In yet another alternative embodiment the two eccentric surfaces 112 can be arranged on the sides of the rotor 110 for engagement by the brake effecter module 120 having actuators 122 extending laterally toward the sides of the rotor 110.

FIGS. 3 A and B are a front and side partial cross-sectional views, respectively, of the brake effecter module 120 with which the present invention can be used. The pair of actuators 122 engages the rotor 110 (not shown in FIGS. 3 A and B, see FIGS. 1 A and B) in order to generate braking forces. Each actuator 122 is comprised of a cam follower 130 and a hydraulic cylinder 132. The hydraulic cylinder 132 contains a piston 134 which can reciprocate in the hydraulic cylinder 132. The cam follower 130 is connected to the piston 134 and moves in and out of the hydraulic cylinder 132, through an aperture, in conjunction with movement of the piston 134. A low-friction interface 136 is disposed at one end of the cam follower 130. The low-friction interface 136 can engage (i.e. come in contact with) one of the eccentric surfaces 112 of the rotor. The low-friction interface 136 preferably generates little frictional resistance to rotational motion of the rotor relative to the actuator 122. The low-friction interface 136 can, for example, be comprised of a ball bearing, a roller bearing or other similar low-friction bearing mechanisms including sliding mechanisms.

Figures 3A, 3B:
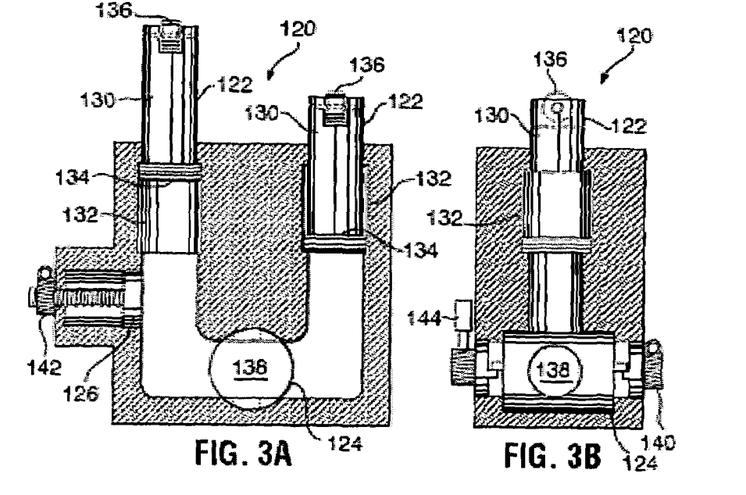

When the brake system 100 is applying braking force, the actuator 122 is engaged with the rotor 110. Each cam follower 130 moves back and forth (i.e. reciprocates) in response to the undulations on the eccentric surface 112 of the rotating rotor 110. The back and forth movement of the cam follower 130 results in similar movement of the piston 134 and therefore expansion and contraction of the volume of working fluid in the hydraulic cylinder 132.

The actuators 122 are arranged to engage different points along the respective cam profiles (i.e. undulations) of the eccentric surfaces 112 such that one actuator 122 is engaged with a rising portion of one eccentric surface 112 while the other actuator 122 is engaged with a falling portion of the other eccentric surface 112 at a given position of the rotor 110. At any point in the rotation of the rotor 110 one of the actuators 122 has its cam follower 130 extending out to the rotor 110 while the other actuator 122 has its cam follower 130 being retracted in by the rotor 110. In an alternative embodiment the rotor 110 can have a single eccentric surface 112 and the brake effecter module 120 be so arranged that each of the two actuators 122 engages the single eccentric surface 112 such that one actuator 122 is engaged with a rising portion of the eccentric surface 112 while the other actuator 122 is engaged with a falling portion of the eccentric surface 112 at a given position of the rotor 110.

As the actuators 122 extend and retract in response to the rotation of the rotor 110 each in turn alternately pumps working fluid out and pumps working fluid in. Restriction of the working fluid flow by the brake control valve 124 results in restricted displacement of working fluid from one hydraulic cylinder 132 to the other hydraulic cylinder 132. In turn the extension and the retraction of the actuators 122 is resisted by the restricted working fluid flow out of each actuator 122 thereby applying a braking force to the rotor 110.

Figure 3C:
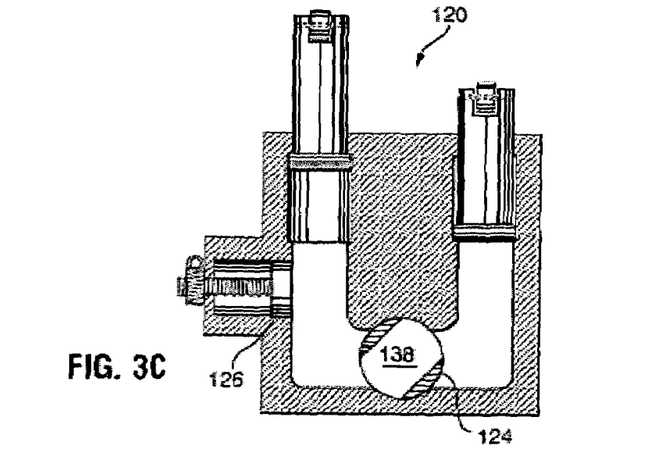
Figure 3D:
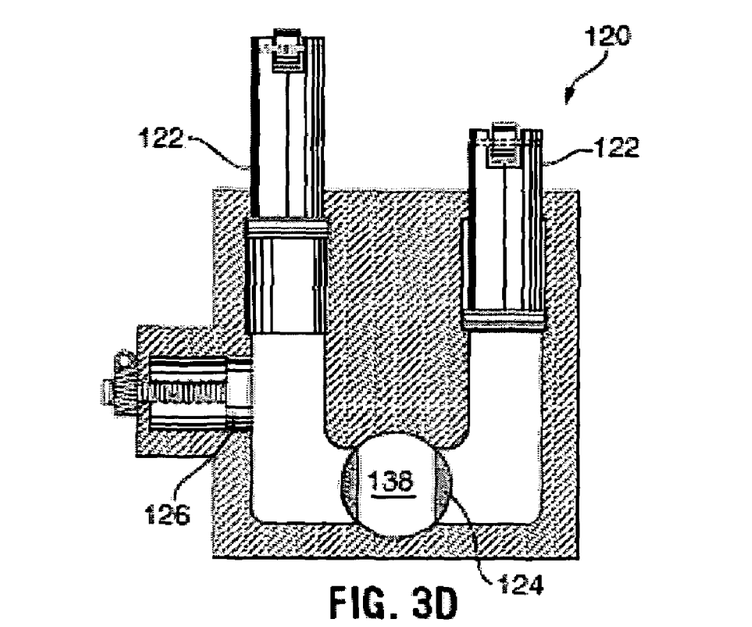
Figure 3E:
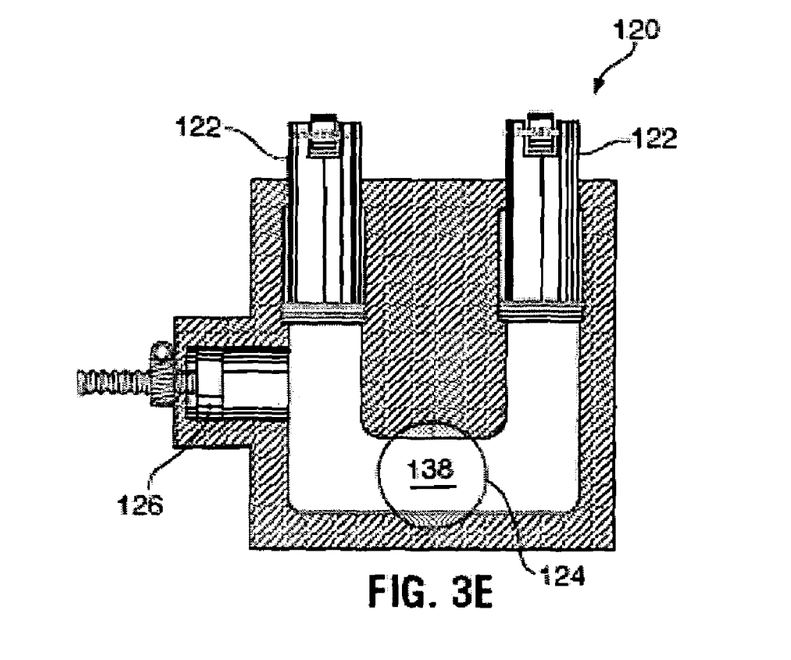

The interconnection between the two actuators 122 can have substantially the same cross-sectional area as the bores of the hydraulic cylinders 132 in the actuators 122 thereby providing for substantially unrestricted fluid communications when the brake control valve 124 is in an open position (see FIGS. 3A and B). The brake control valve 124 is operable from the open position to a closed position (see FIG. 3D) while providing progressively restricted flow at positions in between (see FIG. 3C). The brake control valve 124 can, for example, be a spool valve, a ball valve, port valve or other similar proportionate flow-restricting mechanism. The brake control valve 124 provides for substantially unrestricted fluid flow through when in the open position. The brake control valve 124 can provide one or more passages 138 through which the working fluid can flow.

The braking force applied to the rotor 110 is proportional to a brake force control signal received by the brake system 100. The brake force control signal is proportionate to a desired braking input provided by a vehicle operator at an operator interface such as, for example, a brake pedal (not shown). The brake force control signal can take the form of an electrical signal, a hydraulic pressure signal, a pneumatic signal or other similar signaling mechanisms (not shown) that provide for the propagation of a proportionate (i.e. variable) control signal. Correspondingly, the brake control valve 124 can be operated by an electric motor, an electric solenoid, a hydraulic actuator, a pneumatic actuator or other similar mechanism (not shown). In the case of a hydraulic pressure signal, the pressure required for the hydraulic pressure signal can be substantially less than the operating pressure of the working fluid in the brake system 100.

Referring again to FIG. 3B, the brake control valve 124 is operated by an electric motor (not shown) through a worm gear arrangement 140. The worm gear arrangement 140 provides for the electric motor to operate the brake control valve 124 to any position from the open position to the closed position. In addition, since the worm gear arrangement 140 is non-reversible, it prevents any other forces acting on the brake control valve 124 (such as internal forces resulting from restricted working fluid flow) from operating the brake control valve 124 to a different position.

The brake exciter 126 provides for expansion of the hydraulic volume of the interconnection between the actuators 122. The brake exciter 126 is operable between an engage position (see FIGS. 3 A, C and D) and a disengage position (see FIG. 3 E). In the engage position, the actuators 122 are in engagement with the rotor and therefore braking force can be applied. In the disengage position, the actuators 122 are withdrawn out of engagement with the rotor thereby eliminating resistance on the rotor when braking force is not being applied. Disengagement of the actuators 122 is effected by the exciter increasing the hydraulic volume of the interconnection between the actuators 122 when in the disengaged position thereby causing the actuators 122 to be drawn into their respective hydraulic cylinder 132s.

The brake exciter 126 can be operated by an electric motor (not shown) through a worm gear arrangement 142. The worm gear arrangement 142 provides for the electric motor to operate the brake exciter 126 from the engage position to the disengage position. In addition, since the worm gear arrangement 142 is non-reversible, it prevents any other forces acting on the brake exciter 126 (such as operating pressure of the working fluid) from operating the brake exciter 126 toward the disengage position. In an alternative embodiment the brake exciter 126 can be operated by an electric stepper motor, an electric solenoid, a hydraulic actuator, a pneumatic actuator or other similar mechanisms.

In an alternative embodiment of the brake system 100, a plurality of brake effecter modules 120 can engage a rotor 110.

Figure 3F:
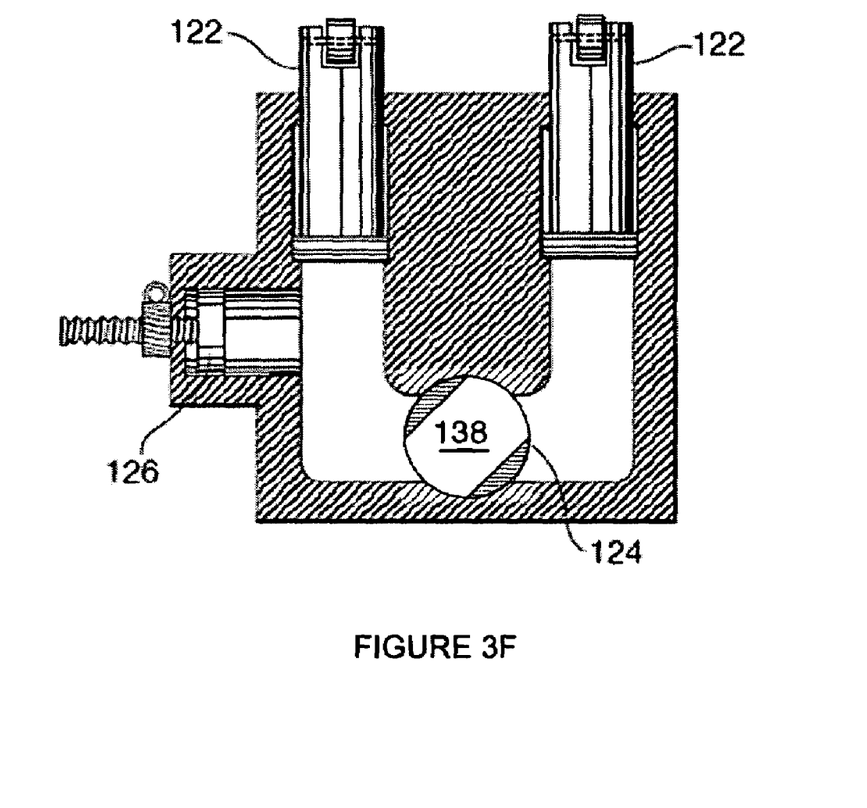

Referring again to FIG. 4, each brake disengagement module 430 is arranged to allow normal operation of the exciter 126 of the brake system 100 to which it is operably connected and to provide for overriding of the normal operation of the exciter 126. The control module 410 can send a control signal to the brake disengagement module 430 to cause it to override the normal operation of the exciter 126 when the control module 410 has determined that the wheel with which the brake disengagement module 430 is associated is in a state of immanent brake lock-up. When the brake system 100 is applying braking force the exciter 126 is normally in the engage position (see FIG. 3C). The brake disengagement module 430 overrides the normal operation of the exciter 126 by operating the exciter 126 into the disengage position thereby mitigating the braking action of the brake system 100 (see FIG. 3F). Operation of the exciter 126 into the disengage position causes the actuators 122 to retract out of engagement with the rotor 110. The control signal from the control module 410 can cause the brake disengagement module 430 to cycle between overriding the normal operation of the exciter 126 and allowing normal operation. When normal operation of the exciter 126 is restored, the actuators reengage the rotor 110 and provide for braking action by the brake system 100. The control module 410 can control the cycle frequency and duration of intervention (i.e. overriding of normal exciter 126 operation) of the brake disengagement module 430 in order to regulate the braking action of the brake system 100.

The control module 410 can control each of the brake disengagement modules 430 separately to provide for individual regulation of the brake system 100 at each of the wheels.

The antilock brake system 400 of the present invention does not directly affect the brake control signal being provided to the brake system 100. Regulation of the brake force is accomplished by disengaging the actuators from the rotor while not requiring that operation of the brake control valve 124 be affected.

It will be apparent to one skilled in the art that numerous modifications and departures from the specific embodiments described herein may be made without departing from the spirit and scope of the present invention.

The invention claimed is:

1. An antilock brake system for use in a wheeled vehicle having associated with each of a plurality of wheels a self-energizing brake system having hydraulically interconnected actuators that act on an eccentric rotor to generate a brake force and a brake exciter that provides for operating the actuators between a first position not in engagement with the eccentric rotor and a second position in engagement with the eccentric rotor, the antilock brake system comprising:
    a plurality of wheel speed sensors, each one connected to one of the plurality of wheels such that it can sense rotation of the wheel and generate a speed signal representative of the speed of rotation of the wheel;
    a control module that can receive said speed signal from each of said plurality of wheel speed sensors, can apply pre-determined algorithms to said speed signals to determine when any of the wheels is in a state of immanent brake lock-up and can generate a control signal for a wheel that is in a state of immanent brake lock-up; and a plurality of brake disengagement modules, each one associated with a self-energizing brake system, that can, responsive to said control signal received from said control module, cause the exciter to operate the actuators into the first position not in engagement with the eccentric rotor;

wherein cyclic generation of said control signal by said control module provides for regulation of braking forces generated by the self-energizing brake system.

2. The antilock brake system of claim 1 wherein the control module can further vary a frequency and a duration of the generated control signal.

3. The antilock brake system of claim 1 wherein the control module can further concurrently generate a plurality of control signals each one associated with a different wheel.

* * * * *